United States Patent
Sasanuma et al.

(10) Patent No.: US 6,384,857 B2
(45) Date of Patent: *May 7, 2002

(54) APPARATUS FOR FORMING IMAGES, METHOD OF CONTROLLING THE APPARATUS, AND STORAGE MEDIUM

(75) Inventors: Nobuatsu Sasanuma, Yokohama; Tetsuya Atsumi, Tokyo; Yuichi Ikeda, Waseda-machi; Yasuhiro Saitou, Yamato, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/897,549

(22) Filed: Jul. 21, 1997

(30) Foreign Application Priority Data

Jul. 23, 1996 (JP) ............................................. 8-193728

(51) Int. Cl.$^7$ .................................................. B41J 2/47
(52) U.S. Cl. ....................................... 347/251; 347/240
(58) Field of Search ................................. 347/240, 251, 347/252, 131, 261; 358/296, 298, 451, 453, 456; 399/86; 395/102, 107; 382/298, 299

(56) References Cited

U.S. PATENT DOCUMENTS

| 4,743,944 A | * | 5/1988 | Tomosada et al. ............. 399/86 |
| 5,031,034 A | | 7/1991 | Shimizu et al. .............. 358/529 |
| 5,166,786 A | | 11/1992 | Sakai et al. .................. 358/527 |
| 5,493,411 A | * | 2/1996 | Haneda et al. ............... 358/298 |
| 5,574,563 A | * | 11/1996 | Hayashi et al. .............. 358/296 |

* cited by examiner

Primary Examiner—Hai Pham
(74) Attorney, Agent, or Firm—Fitzpatrick, Cella, Harper & Scinto

(57) ABSTRACT

An image forming apparatus that increases the relative resolution of a small image to be output for recording. When the image forming apparatus is used for copying an image of an original document, when the size of an image to be output is not greater than a predetermined size, a CPU controls a resolution switching unit for increasing the resolution to form an image with increased resolution.

12 Claims, 7 Drawing Sheets

APPARATUS FOR FORMING IMAGES, METHOD OF CONTROLLING THE APPARATUS, AND STORAGE MEDIUM

BACKGROUND OF THE INVENTION

1. Field of the Invention

The present invention relates to an apparatus for forming images, a method of controlling the apparatus and a storage medium. More particularly, the present invention relates to an image forming apparatus for forming a visible image on a predetermined recording medium, a method of controlling the apparatus, and a storage medium storing a program used for forming the visible image.

2. Description of the Related Art

An electrophotographic printer will be described as one example of a conventional image forming apparatus.

First, the electrophotographic printer employs, as an image signal, a signal with a resolution of 400 dpi. Then, a gradation image reproducing section of the printer sets the resolution of an output image under conditions favorable for reproducing intermediate tones, i.e., 200 dpi in the direction of main scan (direction in which an image is scanned by a laser) and 400 dpi in the direction of sub-scan (direction perpendicular to the direction of main scan). On the other hand, a character/line image reproducing section of the printer sets the resolution of an output image under conditions favorable for reproducing character edges, i.e., 400 dpi in the direction of main scan and 400 dpi in the direction of sub-scan.

Further, in certain copying machines, an image is reproduced with pixel resolution of 200 dpi in the direction of main scan and 400 dpi in the direction of sub-scan in a mode where an emphasis is placed on gradation, such as a printed photo mode or a photographic paper photo mode, and with pixel resolution of 400 dpi in the direction of main scan and 400 dpi in the direction of sub-scan in a mode where an emphasis is placed on edge reproduction of character/line images, such as a character mode or a map mode.

Additionally, in a character/photo mode, an edge portion of characters and thin lines is determined as to whether it represents an area of a gradation image or a character/line image. Then, the area determined as being a gradation image is reproduced with pixel resolution of 200 dpi in the direction of main scan and 400 dpi in the direction of sub-scan, while the area determined as being a character/line image is reproduced with pixel resolution of 400 dpi in the direction of main scan and 400 dpi in the direction of sub-scan.

Even for a gradation image, however, persons tend to very often look at the image from a short distance when the image size is small.

This raises a problem that when the resolution is lowered by reason of a gradation image as mentioned above, the contours of dots now becomes conspicuous and image quality deteriorates contrary to the user's intention. In particular, when the image is observed at a distance of about 15 cm from the image to the viewer's eye, the presence of each dot is visually recognized and such problem is more conspicuous.

SUMMARY OF THE INVENTION

In view of the above-stated problem in the art, an object of the present invention is to provide an apparatus for forming images, a method of controlling the apparatus, and a storage medium, with which pixel resolution is relatively raised when the size of an image to be output for recording is small, enabling even a gradation image to be visually perceived with satisfactory quality when observed from a short distance.

To achieve the above object, an apparatus for forming images according to the present invention is constructed as follows. Specifically, in an image forming apparatus for forming a visible image on a predetermined recording medium based on input digital image data, the apparatus comprises image forming means capable of forming visible images with multiple degrees of resolution, and control means for controlling the image forming means to select one of the multiple degrees of resolution depending on the size of an image area to be formed by the image forming means.

In the above image forming apparatus, preferably, the control means controls the image forming means to select one of the multiple degrees of resolution depending on the size of a recording medium. With this feature, optimum resolution can be simply set when an original image is recorded on a smaller scale, for example.

In the above case, preferably, the control means controls the image forming means to select the higher one of the multiple degrees of resolution as the size of a recording medium is reduced. With this feature, even when a printed image is observed from a short distance, the contours of dots become less conspicuous and the image can be visually recognized with good quality.

The image forming apparatus may further comprise document reading means, and designating means for designating an effective area in a document read by the document reading means, the control means controlling the image forming means to select one of the multiple degrees of resolution depending on the size of the effective area designated by the designating means. In this case, preferably, the control means controls the image forming means to select the higher one of the multiple degrees of resolution as the effective area designated by the designating means is reduced.

Alternatively, the image forming apparatus may further comprise document reading means, and preparing means for preparing a histogram of density distribution in a document read by the document reading means, the control means controlling the image forming means to select one of the multiple degrees of resolution depending on the density distribution given by the prepared histogram.

Other objects and forms of the present invention will be apparent from the following description made with reference to the drawings and the attached claims.

DETAILED DESCRIPTION OF THE PREFERRED EMBODIMENTS

Preferred embodiments of the present invention will be described in detail hereunder with reference to the accompanying drawings.

(First Embodiment)

Figure 1:
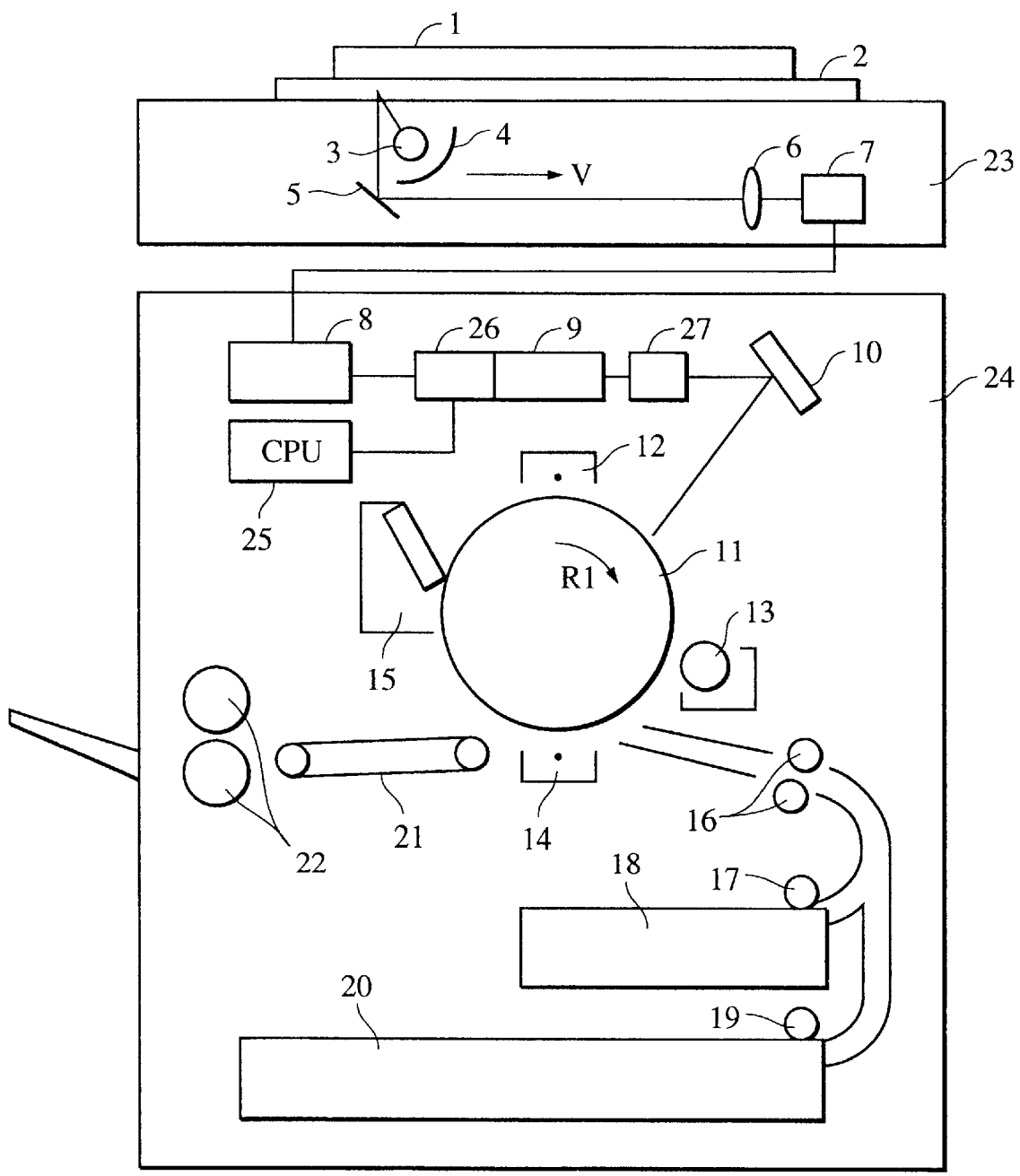
FIG. 1 is a sectional view showing the construction of an image forming apparatus according to a first embodiment.

FIG. 1 shows the sectional construction of an image forming apparatus, practiced as a copying machine, according to a first embodiment. As shown, the copying machine comprises a reading apparatus 23 and an image forming apparatus 24.

Various components of the reading apparatus 23 will be described below in conjunction with the operation.

An original document 1 put on a document glass plate 2 is illuminated by light delivered by a combination of a light source 3 and a reflecting mirror 4. The light reflected by the document 1 is bent in its optical path by a turning-back mirror 5 and then focused by an optical lens 6 onto a CCD sensor (hereinafter abbreviated to CCD) 7 in a one-dimensional array. The light source 3, the reflecting mirror 4 and the turning-back mirror 5 are scanned together as one unit in the direction of arrow V to thereby take in a two-dimensional document image. Note that the reading apparatus 23 in this embodiment is capable of reading an original document up to the A3 (11 inch×17 inch) size at maximum.

Users of the copying machine can set a desired paper size (size of an output medium), on which an original image is to be copied, from a control panel (not shown). In some cases, users can also automatically or manually set a zooming ratio so that an original image may be copied in a desired paper size different from the original size. The zooming ratio is changed by controlling the speed V in the direction of main scan of the document and by performing an interpolating or thinning-out process in the direction of sub-scan of the document.

Alternatively, the copying machine may be designed to select a paper size (size of an output medium) by using a well-known means for automatically sensing the document size or in response to an instruction from the control panel (not shown).

An image signal produced by the CCD 7 is sent to an image processing section 8 of the image forming apparatus 24.

The image processing section 8 converts an analog signal sent from the CCD 7 into a digital signal, carries out a predetermined image process including y-correction, etc., and outputs image data to a resolution switching section 26. Based on the image data from the image processing section 8, the resolution switching section 26 produces a video signal (i.e., a signal for driving a semiconductor laser unit 9). Resolution of the image data produced at this time is controlled by a CPU 25 (as described later in detail).

In accordance with the applied video signal, the semiconductor laser unit 9 emits a laser beam during a period in which the video signal has a high level. The emitted laser beam is irradiated to and reflected by one side face of a rotating polygonal mirror 27 so that it is oscillated to make a one-dimensional scan. The oscillated laser beam is reflected by a reflecting mirror 10 to scan the surface of a photosensitive drum 11 for exposure.

The photosensitive drum 11 is rotating at a constant speed in the direction of arrow R1 as shown. Around the photosensitive drum 11, there are disposed a charger 12 for uniformly charging the surface of the photosensitive drum 11, a developer 13 for depositing toner on an electrostatic latent image formed by the exposure of the laser beam, thereby developing the latent image, a transfer device 14 for transferring a toner image onto a sheet of recording paper, and a cleaner 15 for scraping off the toner remaining on the surface of the photosensitive drum 11.

Sheets of recording paper (having different sizes from each other) are stored in paper feed cassettes 18, 20. The CPU 25 drives a paper feed roller 17 or 19 to start transport of the top one of the paper sheets in the corresponding cassette, and also drives feed rollers 16 at the predetermined timing, causing the sheet of recording paper to be inserted between the photosensitive drum 11 and the transfer device 14. As an alternative, a sheet of recording paper having a desired size may be inserted through a manual feed inlet (not shown) so that an image is recorded on the inserted sheet of recording paper.

As a result, the toner image is transferred onto the sheet of recording paper. The sheet of recording paper having the toner image transferred thereon is moved over a transport belt 21 to a fuser 22 where the toner image is finally fused. After that, the sheet of recording paper is ejected out of the apparatus.

In the above-described embodiment of the image forming apparatus which is constructed to be capable of switching resolution, when the size of a document to be output is not larger than a predetermined size (e.g., B5 size), an image is recorded with a resolution (e.g., 400 dpi in both the directions of main scan and sub-scan) higher than the resolution (e.g., 200 dpi in the direction of main scan and 400 dpi in the direction of sub-scan) that is usually employed when the document is an intermediate-tone image (photographic image). Of course, this switching operation is also performed even for an original document to be read having A4 size, for example, if the original document is reduced to a size not larger than B5 when recorded.

Figure 8:
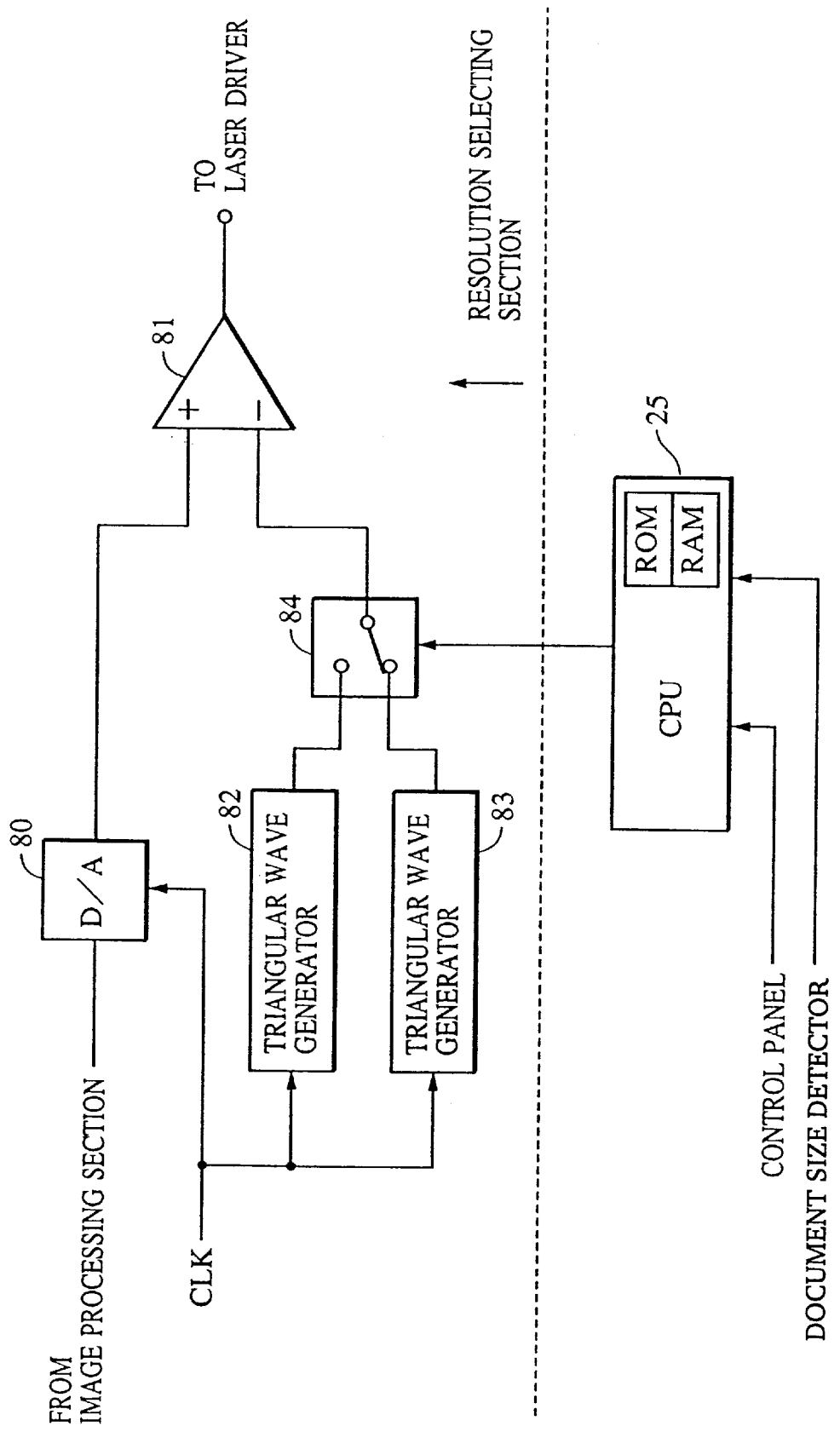
FIG. 8 is a block diagram of a resolution switching section and a CPU in the first embodiment.

FIG. 8 shows one example of the configuration of part of the resolution selecting section 26 and the CPU 25.

As shown in FIG. 8, the resolution switching section 26 receives the digital image data (e.g., 8 bits=256 gradations per pixel) processed by the image processing section 8 in synch with a pixel clock CLK. The received data is converted into an analog signal by a D/A converter 80. The resulting analog signal is supplied to one input terminal of a comparator 81.

A pattern signal (triangular wave in this embodiment) generated by one of triangular wave generators 82, 83 is supplied to the other terminal of the comparator 81. A switch 84 is provided to select one triangular wave and changes over under control of the CPU 25.

As a result, the comparator 81 outputs a signal (pulse width modulation signal) with a width corresponding to the value of the digital pixel data. While the output signal of the comparator 81 is at a high level, a semiconductor laser device is driven to emit a laser beam for a time corresponding to the value of the digital pixel data. Because the laser beam is one-dimensionally oscillated by the rotating polygonal mirror 27, the laser beam scans the surface of the photosensitive drum 11 for exposure in a length corresponding to the value of the digital pixel data. Eventually, toner is deposited over an area corresponding to the value of the digital pixel data, and persons visually perceive the toner area as density of a reproduced image.

The triangular wave generators 82 and 83 differ from each other in that the triangular wave generator 82 generates a triangular wave (for 200 dpi) at frequency equal to ½ of the carrier clock CLK, whereas the triangular wave generator 83 generates a triangular wave (for 400 dpi) at frequency equal to the carrier clock CLK.

Figure 2:
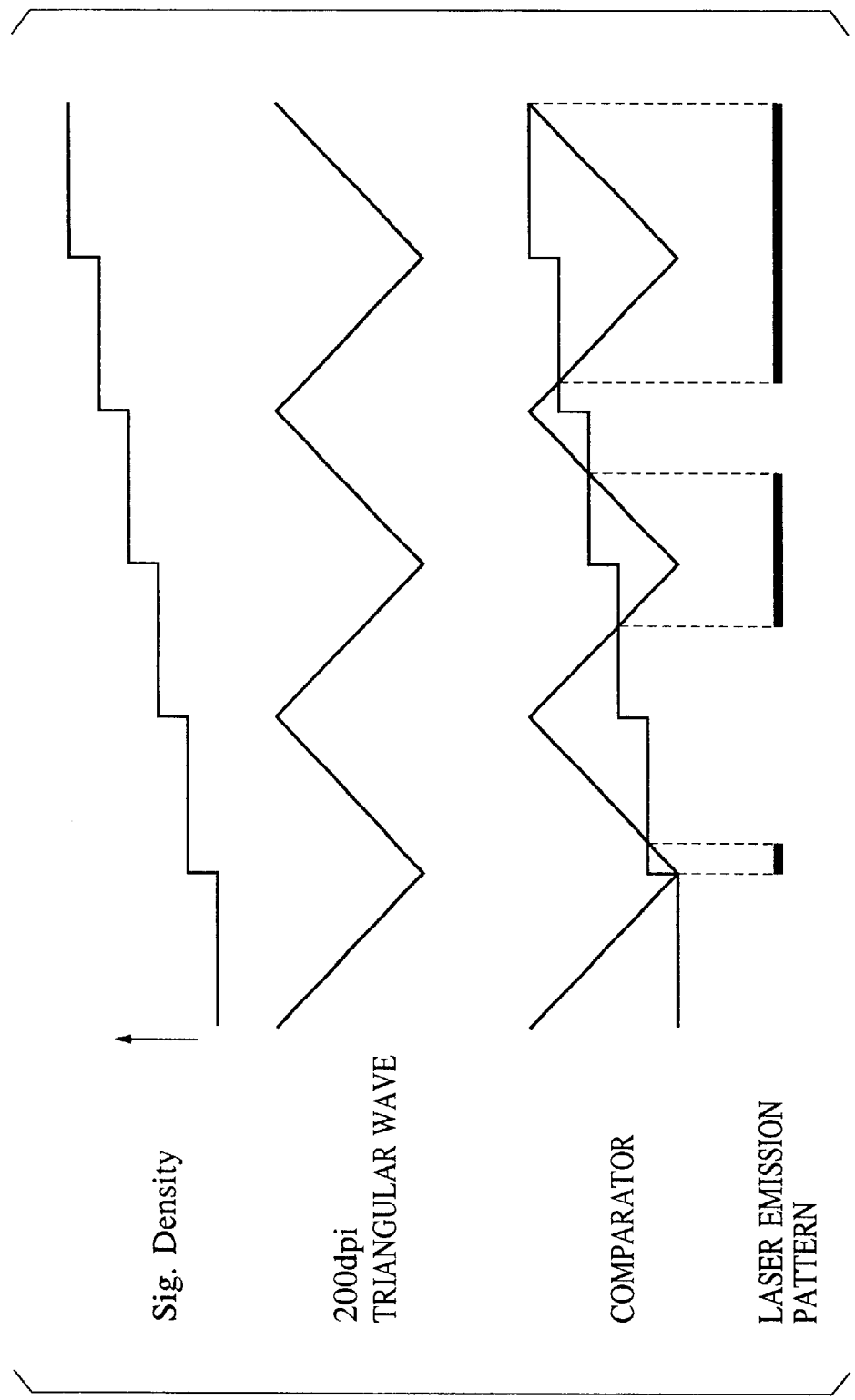
FIG. 2 is a chart for explaining the principle of forming pixels of 200 dpi in the direction of main scan in the first embodiment.
Figure 3:
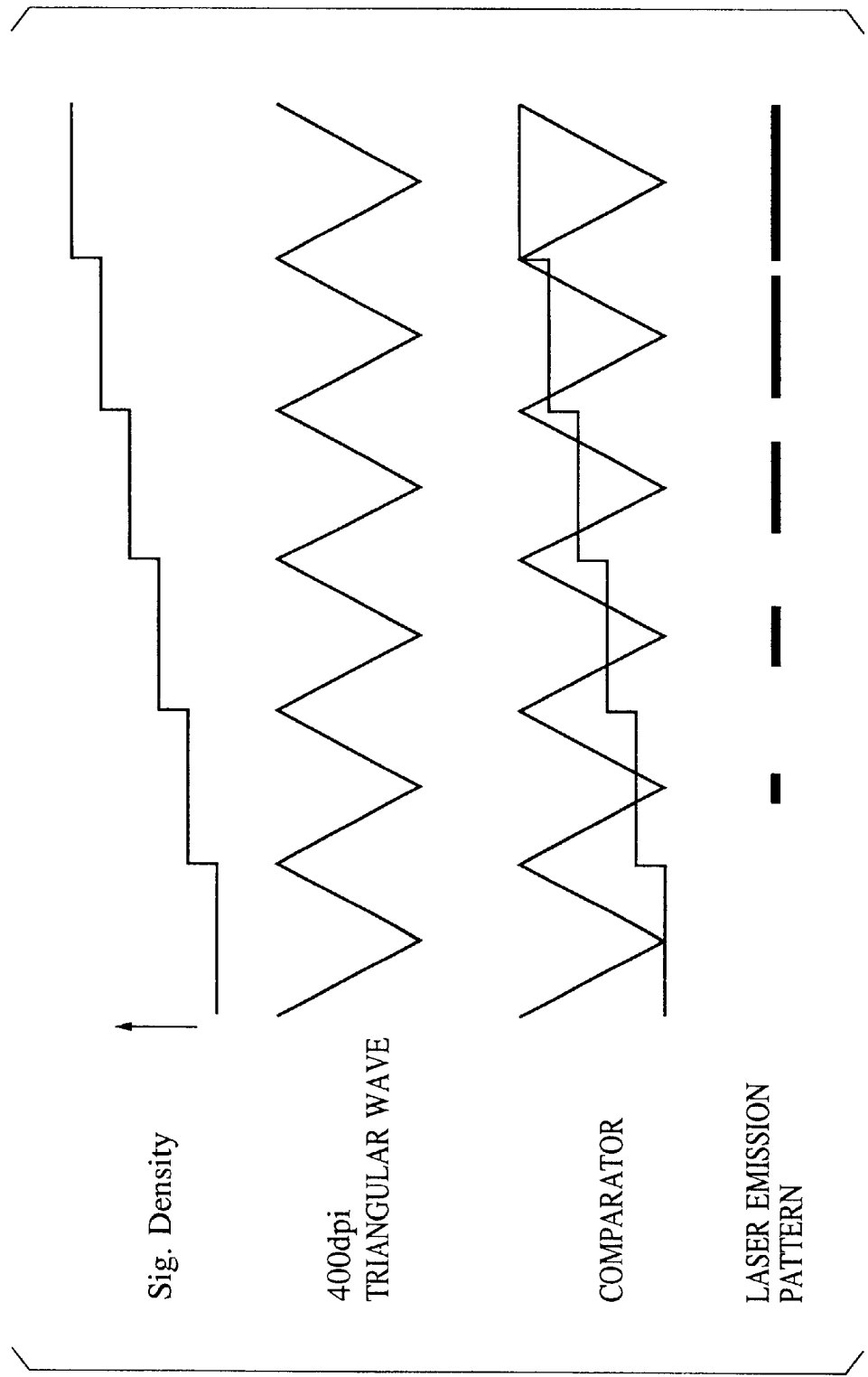
FIG. 3 is a chart for explaining the principle of forming pixels of 400 dpi in the direction of main scan in the first embodiment.

This results in laser emission patterns as shown in FIGS. 2 and 3, by way of example, when the triangular wave from the triangular wave generator 82 and the triangular wave from the triangular wave generator 83 are selected, respectively.

Specifically, in the case of FIG. 2, formed dots are relatively large, which is favorable to reproduce a gradation image with a good gradient. On the other hand, relatively small dots (with higher resolution) as shown in FIG. 3 are favorable to reproduce characters and line drawings. As explained before, however, persons tend to usually look at prints, etc. from a short distance when the print size is small. This means that, at a resolution of 200 dpi, roughness of relatively large dots becomes conspicuous to such an extent as deteriorating image quality even with a good gradient. For this reason, this embodiment is designed to record an image with a resolution of 400 dpi in both the directions of main scan and sub-scan when the size of a document to be output is not larger than the predetermined size.

Figure 4:
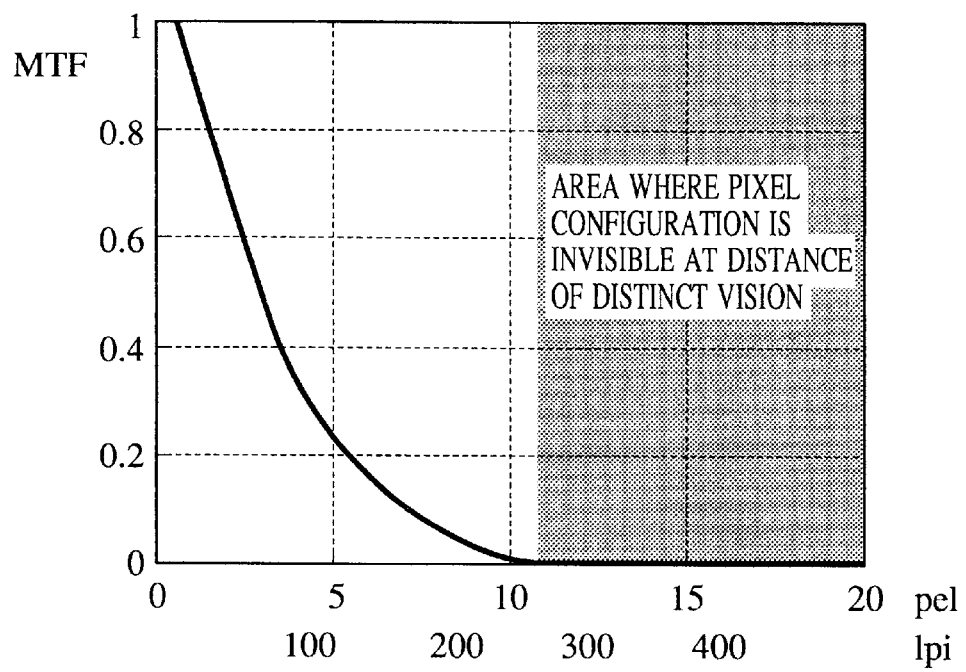
FIG. 4 is a graph showing an MTF characteristic of the human sense of vision.

In other words, when an image is formed on a small sheet of paper of not larger than the predetermined size (B5 in this embodiment), the apparatus of this embodiment forms the image in a high-resolution mode, particularly in a mode where pixels are produced with a period not less than 111 lines/mm, i.e., 250 dpi, as shown in FIG. 4, so that a visually pleasing image can be obtained.

More specifically, suppose, for example, that a full-length image of one person is formed on a sheet of paper of post card size. If such an image is reproduced with resolution of 200 dpi in the direction of main scan and 400 dpi in the direction of sub-scan as conventional, the pixel configuration of a reproduced image would be conspicuous when looking at the face of the person, and the reproduced image would have unsatisfactory reproducibility in its details when viewed from a short distance. By contrast, in this embodiment, the resolution in the direction of sub-scan is increased to such an extent that viewers cannot visually recognize the pixel configuration. As a result, a better-looking image can be obtained which is finely and clearly reproduced in detail.

In this embodiment, sheets of paper of not larger than the B5 size are assumed to be small in size. But it is needless to say that the size requiring the resolution switching operation is not generally restricted because the criteria used for judging whether or not a sheet of paper is small in size from the resolution point of view may change depending on characteristics of an individual image forming apparatus.

Incidentally, gradation reproducing characteristics in this embodiment are independently adjustable in accordance with gradation converting characteristics (i.e., a γ-lookup table) for each of the modes so that the density of the reproduced image becomes equal to the density of the original document in either of the high-resolution mode and the conventional gradation image reproducing mode.

It is also needless to say that this embodiment is applicable to digital full-color copying machines as well, rather than being restricted to monochrome (black-and-white) copying machines.

Further, the above embodiment has been described in connection with the case of switching the resolution between two values (i.e., 400 dpi and 200 dpi in the direction of main scan). However, when a printer engine has high resolution of 1200 dpi, the resolution may be changed in multiple steps depending on the size of sheets of recording paper to be output. Specifically, in such a case, three or more triangular generators are prepared and appropriately switched over from one to another. It is of course desired for the CCD 7 to intrinsically have high reading resolution. But, depending on the case, the reading resolution may be changed through an interpolating or thinning-out process.

While the resolution switching is realized in the above embodiment by selecting one of the two triangular wave generators, essentially the same operating advantage as described above can also be obtained by making variable the rotating speed of the rotating polygonal mirror and the pixel clock CLK. In the case of high-resolution recording, the number of pixels may be increased for the resolution switching by raising the reading resolution or performing an interpolating process.

(Second Embodiment)

Generally, some models of digital full-color copying machines include an editor having a coordinate input device, such as a digitizer, mounted on a presser plate for retaining a document in place, enabling users to readily carry out various editing functions such as trimming, masking and color conversion.

Figure 5:
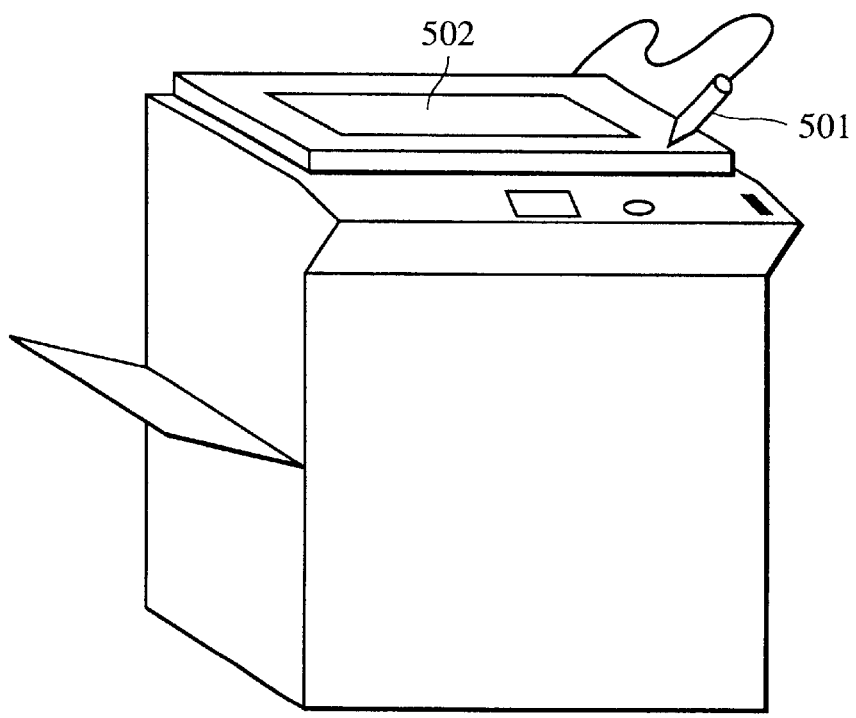
FIG. 5 is a perspective view showing an appearance of a copying machine according to a second embodiment.

A copying machine according to a second embodiment of the present invention includes, as shown in FIG. 5, an editor comprised of a position coordinate designating pen 501 and a base 502 which is sensitive to pressure applied by pushing down the pen 501 and able to determine position coordinate values of the pen. Users can perform trimming of an original document by designating a certain area on the base 502 as desired. In such a copying machine, an image is formed by automatically selecting a high-resolution mode when the trimming size (area) is not larger than 200 $cm^2$, for example, and a low-resolution mode when the trimming size (area) is larger than 200 $cm^2$. By so switching the resolution depending on the trimming size, quality of an image reproduced in small size format can be improved.

In this second embodiment, whether or not to effect the resolution switching is judged based on the trimming size, i.e., the size of a document portion to be trimmed, and does not depend on the size of a sheet of recording paper even when a trimmed image is to be output on a sheet of recording paper of A4 or larger size. The reason is that if the trimmed image is reproduced by full-size recording, the image size actually recorded is a portion of the total sheet size of recording paper and persons tend to eventually look at the recorded image from a short distance.

(Third Embodiment)

In an image forming apparatus of a third embodiment, the apparatus automatically determines the size of a gradation image and selects one of a high-resolution mode and a low-resolution mode depending on the determined result.

Figure 6:
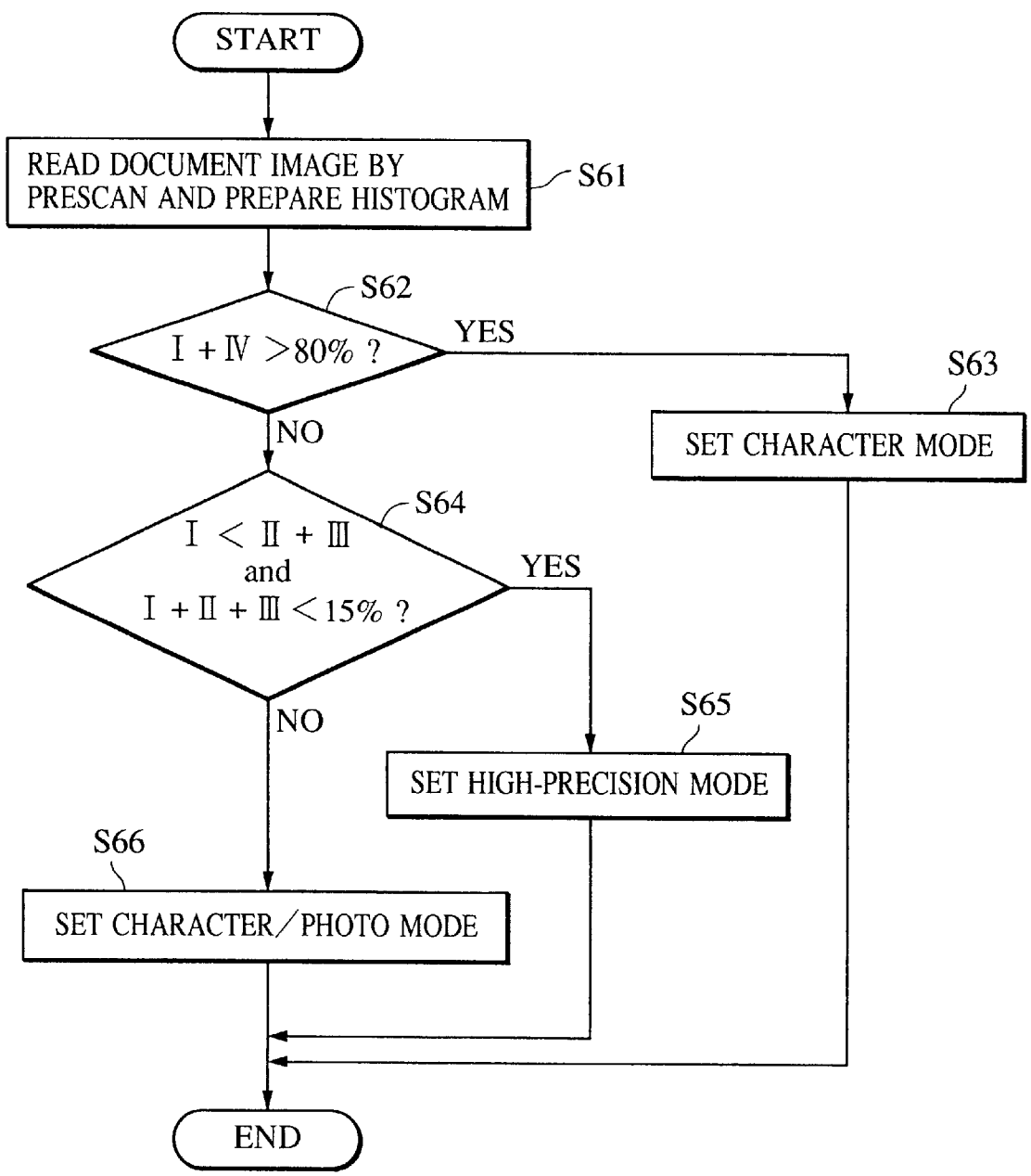
FIG. 6 is a flowchart of processing steps according to a third embodiment.

The image forming apparatus is assumed here to have the same construction as in the above first embodiment, and an operation processing procedure executed by the CPU 25 (i.e., a program stored in ROM of the CPU 25) will be described below with reference to a flowchart of FIG. 6.

First, in step S61, a document image is read by prescan and a histogram of pixel density is prepared.

The histogram is prepared by plotting the number of pixels based on the pixel density ranging from 0 to 255 and dividing the entire range into four regions; i.e., region I from 0 to 64, region II from 65 to 128, region III from 129 to 192, and region IV from 193 to 255.

Figure 7:
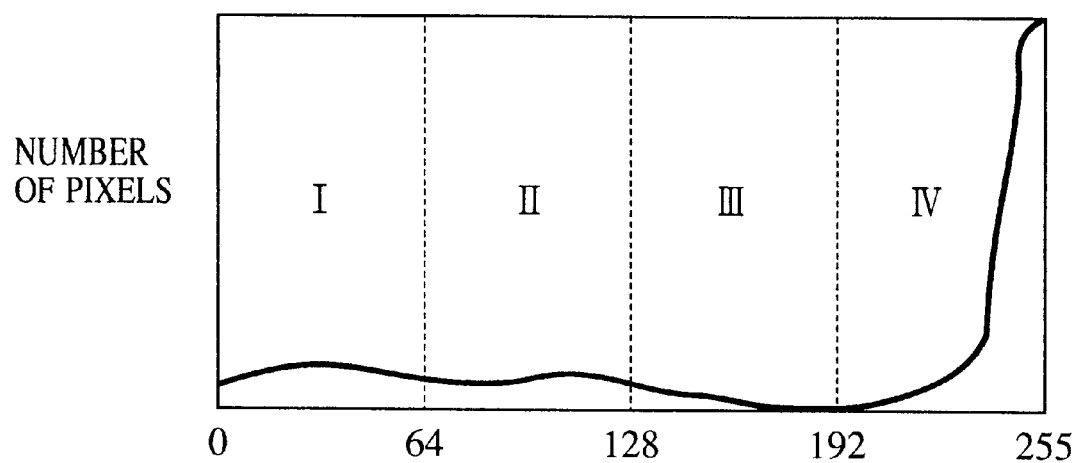
FIG. 7 is a graph showing one example of a histogram prepared in the third embodiment.

The histogram of FIG. 7 represents the case where an original document includes a gradation image of small size.

In consideration of memory capacity, the histogram is prepared in this embodiment based on the pixels thinned out to ¼ of the total number. But the histogram may be of course prepared based on the total number of pixels. It is to be here noted that a distribution of pixels representing the general feature of an image will not be entirely eliminated by thinning out the pixels to ¼ of the total number. From the standpoint of effectively utilizing a memory, therefore, it is desired to execute a thinning-out process (i.e., to increase intervals at which pixels are read).

Then, pixel percentages in the respective areas from I to IV (i.e., percentages of the numbers of pixels in the respective areas with respect to the total pixel number) are determined and registered in a memory.

The process flow goes to step S62 to determine whether the relation of region I+region IV>80% is satisfied or not. If satisfied, then the document image is determined as containing characters at a very high rate and a character mode (i.e., a mode with 400 dpi in the direction of main scan, 400 dpi in the direction of sub-scan and an increased sharpness factor (edge emphasis)) is set (step S63).

The meaning of increasing the sharpness factor will now be briefly described.

Generally, for a binary image comprising characters/line drawings, etc., edges of the image tend to blur if read data of the image is directly utilized. Because it is essentially important that edges of characters/line drawings be clearly reproduced at their boundaries, that tendency produces a contrary result. This requires a density value of the target pixel to be modified in such a manner that the target pixel is emphasized in relation to the surrounding pixels. Such a process of emphasizing the target pixel is usually executed by using a matrix which has coefficients corresponding to pixels in an appropriate area, and modifying the coefficients of the matrix in a suitable manner for the emphasis.

Thus, increasing the sharpness factor in step S63 means that the CPU 25 makes setting adapted to perform a higher degree of edge emphasis.

If the determined result in step S62 is NO, then the process flows goes to step S64 to determine whether the relations of region I<region II+region III and region I+region II+region III<15% are satisfied or not. If satisfied, then it is judged that a gradation image is present in the original document, but its size is small. Therefore, a high-precision mode is set (step S65). The high-precision mode represents a mode where the resolution is the same as in the character mode, but the sharpness factor is relatively reduced.

If the determined result in step S64 is NO, then the process flows goes to step S66 where a character/photo mode (200 dpi in the direction of main scan and 400 dpi in the direction of sub-scan), judging from that the original document is a mixed image containing a gradation image at a relatively high rate and a character area as well.

By setting one of the modes following the above process flow, satisfactory images can be reproduced in an automatic manner from any kinds of original documents.

When this embodiment is applied to color copying machines, the above processing procedure may be modified by, for example, increasing an amount of added black (i.e., a ratio of the black component produced in a UCR process) in step S62 and reducing the amount of added black in step S65.

Also, the above processing procedure may be executed in a default state of the apparatus. In this case, a means for inhibiting the above processing procedure may be provided, allowing the operator to selectively execute the above processing procedure.

Further, while the resolution is changed in the above embodiment by switching the period of a triangular wave, it may be changed by switching, as an alternative, the size of a dither matrix.

(Other Embodiments)

The above embodiments have been described in connection with, by way of example, an application to copying machines. However, the present invention may be applied to an independent printer connected to a host computer, etc., or a system comprising a host computer, an image scanner and a printer.

It is needless to say that the object of the present invention can also be achieved by supplying, to a system or apparatus, a storage medium which stores program codes of software for realizing the function (processing procedure) of any of the above-described embodiments, and causing a computer (or CPU and MPU) in the system or apparatus to read and execute the program codes stored in the storage medium.

In such a case, the program codes read out of the storage medium serve in themselves to realize the function (processing procedure) of any of the above-described embodiments, and hence the storage medium storing the program codes constitutes the present invention.

Storage mediums for use in supplying the program codes may be, e.g., floppy disks, hard disks, optical disks, photomagnetic disks, CD-ROM's, CD-R's, magnetic tapes, non-volatile memory cards, and ROM's.

Also, it is a matter of course that the function (processing procedure) of any of the above-described embodiments is realized not only by a computer reading and executing the program codes, but also by an OS (Operating System) or the like which is working on the computer and executes a part or whole of the actual process to realize the function (processing procedure). Thus, the latter case is naturally involved in the concept of the present invention.

Further, it is a matter of course that the present invention involves such a case where the program codes read out of the storage medium are written into a memory built in a function extension board mounted in the computer or a function extension unit connected to the computer, and a CPU incorporated in the function extension board or unit executes a part or whole of the actual process in accordance with instructions from the program codes, thereby realizing the function (processing procedure) of any of the above-described embodiments.

As described hereinabove, according to the present invention, since resolution is controlled depending on the size of an image to be formed, it is possible to form images having satisfactory quality even when observed from a short distance.

It is to be understood that the present invention is not limited to the above-described embodiments, but may be modified or applied in various ways within the scope of the claims.

What is claimed is:

1. An image forming apparatus for forming a visible image on a recording medium based on input digital image data with a character image and a halftone image, said apparatus comprising:

image forming means for forming visible images with multiple degrees of resolution;

determining means for determining a size of an image area to be formed by said image forming means based on input digital image data; and control means for forming the character image included in said digital image data at a first degree of resolution and forming the halftone image included in said digital image data at a second degree of resolution which is lower than said first degree of resolution when the size determined by said determining means is larger than a predetermined size, and forming said character image at said first degree of resolution and forming said halftone image at a third degree of resolution that is higher than said second degree of resolution when the size determined by said determining means is the same as or smaller than the predetermined size.

2. An image forming apparatus according to claim 1, wherein said determining means determines the size of the image area based on a size of the recording medium.

3. An image forming apparatus according to claim 2, wherein said control means controls said image forming means to select a higher degree of resolution as the size of the image area is reduced.

4. An image forming apparatus according to claim 1, further comprising:

document reading means, and designating means for designating an image area in a document read by said document reading means.

5. An image forming apparatus according to claim 1, further comprising:

document reading means; and preparing means for preparing a histogram of density distribution in a document read by said document reading means, wherein said determining means determines a size of a gradation image based on the histogram; and said control means controls said image forming means to select one of the different degrees of resolution depending on the size of the gradation image area.

6. An image forming apparatus according to claim 1, wherein said third degree of resolution is equal to said first degree of resolution.

7. A method of controlling an image forming apparatus for forming a visible image on a predetermined recording medium with a selected one of multiple degrees of resolution based on input digital image data with a character image and a halftone image, said method comprising the steps of:

determining a size of an image area to be formed by the image forming apparatus; and forming the character image included in the digital image data at a first degree of resolution and forming the halftone image included in the digital image data at a second degree of resolution which is lower than the first degree of resolution when the size determined at said determining step is larger than a predetermined size, and forming the character image at the first degree of resolution and forming the halftone image at a third degree of resolution that is higher than the second degree of resolution when the size determined at said determining step is the same as or smaller than the predetermined size.

8. A method of controlling an image forming apparatus according to claim 7, wherein said determining step determines the size of the image area based on a size of the recording medium.

9. A method of controlling an image forming apparatus according to claim 8, wherein said forming step controls the image forming apparatus to select a higher degree of resolution as the size of the image area is reduced.

10. A method of controlling an image forming apparatus according to claim 7, further comprising the steps of:

reading a document, and designating an image area in a document read in said document reading step.

11. A method of controlling an image forming apparatus according to claim 7, further comprising the steps of:

reading a document, and preparing a histogram of density distribution in the document read in said document reading step, wherein said determining step determines a size of a gradation image based on the histogram, and said forming step controls said image forming apparatus to select one of the different degrees of resolution depending on the size of the gradation image area.

12. A method of controlling an image forming apparatus according to claim 7, wherein the third degree of resolution is equal to the first degree of resolution.

* * * * *